(12) United States Patent
Seo et al.

(10) Patent No.: US 11,740,829 B2
(45) Date of Patent: Aug. 29, 2023

(54) STORAGE DEVICE FOR STORING MODEL INFORMATION, STORAGE SYSTEM INCLUDING THE STORAGE DEVICE, AND OPERATING METHOD OF THE STORAGE SYSTEM

(71) Applicant: SAMSUNG ELECTRONICS CO., LTD., Suwon-si (KR)

(72) Inventors: Jungmin Seo, Seongnam-si (KR); Byeonghui Kim, Hwaseong-si (KR)

(73) Assignee: SAMSUNG ELECTRONICS CO., LTD.

( * ) Notice: Subject to any disclaimer, the term of this patent is extended or adjusted under 35 U.S.C. 154(b) by 70 days.

(21) Appl. No.: 17/032,198

(22) Filed: Sep. 25, 2020

(65) Prior Publication Data
US 2021/0247924 A1     Aug. 12, 2021

(30) Foreign Application Priority Data
Feb. 7, 2020    (KR) ........................ 10-2020-0015210

(51) Int. Cl.
*G06F 3/06*      (2006.01)
*G06N 20/00*     (2019.01)
(Continued)

(52) U.S. Cl.
CPC .......... *G06F 3/0655* (2013.01); *G06F 3/0604* (2013.01); *G06F 3/0619* (2013.01); *G06F 3/0659* (2013.01); *G06F 3/0679* (2013.01); *G06F 3/0683* (2013.01); *G06F 11/2094* (2013.01); *G06F 13/4234* (2013.01);
(Continued)

(58) Field of Classification Search
CPC ........ G06N 20/00; G06N 20/10; G06N 20/20; G06F 3/0604; G06F 3/0619; G06F 3/0655; G06F 3/0659; G06F 3/0664; G06F 3/0679; G06F 3/0683; G06F 3/0688;
(Continued)

(56) References Cited

U.S. PATENT DOCUMENTS

| 9,239,786 B2 | 1/2016 | Ki et al. |
|---|---|---|
| 10,225,365 B1 | 3/2019 | Hotchkies et al. |

(Continued)

FOREIGN PATENT DOCUMENTS

| CN | 109683806 A | 4/2019 |
|---|---|---|
| CN | 109947362 A | 6/2019 |

(Continued)

OTHER PUBLICATIONS

Chinese Office Action dated Dec. 28, 2021, Cited in CN Patent Application No. 202110164346.5.
(Continued)

*Primary Examiner* — Shane D Woolwine
(74) *Attorney, Agent, or Firm* — Fish & Richardson P.C.

(57) ABSTRACT

A storage device includes a memory device storing model information of a machine learning model; and a storage controller that controls an operation of the storage device using the machine learning model. The storage controller, upon receiving a get command for extracting the model information from the host device, reads the model information from the memory device in response to the get command and transmits the model information to the host device.

19 Claims, 16 Drawing Sheets

(51) Int. Cl.
*G06F 11/20* (2006.01)
*G06F 13/42* (2006.01)
*G06F 13/16* (2006.01)

(52) U.S. Cl.
CPC .......... *G06N 20/00* (2019.01); *G06F 3/0664* (2013.01); *G06F 3/0688* (2013.01); *G06F 13/1668* (2013.01); *G06F 13/1694* (2013.01)

(58) Field of Classification Search
CPC ............. G06F 11/2094; G06F 13/1668; G06F 13/1694; G06F 13/4234
See application file for complete search history.

(56) References Cited

U.S. PATENT DOCUMENTS

| | | | |
|---|---|---|---|
| 10,459,844 B2 | 10/2019 | Benisty et al. | |
| 2004/0103246 A1 | 5/2004 | Chatterjee et al. | |
| 2016/0148115 A1 | 5/2016 | Sirosh et al. | |
| 2016/0371584 A1* | 12/2016 | Nicholas | G05B 13/048 |
| 2017/0169358 A1 | 6/2017 | Choi et al. | |
| 2019/0012576 A1 | 1/2019 | Liu et al. | |
| 2019/0114078 A1* | 4/2019 | Oh | G06N 20/00 |
| 2019/0129834 A1 | 5/2019 | Purkayastha et al. | |
| 2019/0250998 A1 | 8/2019 | Bedadala et al. | |
| 2019/0278506 A1 | 9/2019 | Richardson | |
| 2020/0133898 A1* | 4/2020 | Therene | G06N 3/0454 |
| 2021/0064941 A1* | 3/2021 | Khan | G06V 10/82 |

FOREIGN PATENT DOCUMENTS

| | | |
|---|---|---|
| CN | 110502184 A | 11/2019 |
| KR | 10-20190043411 | 4/2019 |
| WO | WO 2019-173075 A1 | 9/2019 |

OTHER PUBLICATIONS

Bishop, Christopher M.: Pattern Recognition and Machine Learning. New York: Springer, 2006. p. 237 . . . ISBN 978-0-387-31073-2.

German First Office Action dated Dec. 5, 2022, Cited in Corresponding DE Patent Application No. 102020126409.7.

* cited by examiner

STORAGE DEVICE FOR STORING MODEL INFORMATION, STORAGE SYSTEM INCLUDING THE STORAGE DEVICE, AND OPERATING METHOD OF THE STORAGE SYSTEM

CROSS-REFERENCE TO RELATED APPLICATION

A claim for priority under 35 U.S.C. § 119 is made to Korean Patent Application No. 10-2020-0015210, filed on Feb. 7, 2020, in the Korean Intellectual Property Office, the entirety of which is incorporated herein by reference.

BACKGROUND

The present disclosure relates to storage devices, storage systems including the storage devices, and operating methods of the storage systems, and more particularly to storage devices for storing model information of a machine learning model, storage systems including the storage devices, and operating methods of the storage systems.

Non-volatile memory may retain stored data even when power is cut off. Recently, storage devices including flash-based non-volatile memory such as an embedded multi-media cards (eMMC), universal flash storage (UFS), solid state drive (SSD), and memory cards have been widely used for storing or moving a great amount of data.

Storage devices may obtain condition information necessary for internal operations of the storage devices by using a stored machine learning model. For example, a storage device may acquire a condition for scheduling a garbage collection operation using a machine learning model. There is however a problem in that a storage device according to the related art may not be capable of updating a machine learning model stored in advance at the time of manufacture.

SUMMARY

Embodiments of the inventive concepts provide a storage device capable of continuously using model information of a machine learning model between different storage devices, a storage system including the storage device, and an operating method of the storage system.

Embodiments of the inventive concepts provide a storage device including a memory device storing model information of a machine learning model; and a storage controller that controls an operation of the storage device using the machine learning model. The storage controller, upon receiving from a host device a get command for extracting the model information from the memory device, reads the model information from the memory device in response to the get command and transmits the model information to the host device.

Embodiments of the inventive concept further provide a storage system including a first storage device and a second storage device each storing model information of a machine learning model; and a host device that manages operations of the first storage device and the second storage device. The host device transmits to the first storage device a get command for extracting the model information when the first storage device is in a fail state. The first storage device extracts the model information stored in the first storage device in response to the get command and transmits the model information to the host device.

Embodiments of the inventive concepts still further provide an operating method of a storage system including a plurality of storage devices and a host device that manages operations of the plurality of storage devices. The method includes determining, by the host device, that a first storage device from among the plurality of storage devices and that stores model information of a machine learning model is in a fail state; transmitting, by the host device, a get command for extracting the model information to the first storage device; transmitting, by the first storage device, the model information to the host device in response to the get command; and rearranging, by the host device, the model information in a second storage device from among the plurality of storage devices other than the first storage device.

Embodiments of the inventive concepts also provide a storage system including a plurality of storage devices each storing model information of a machine learning model; and a host device that manages operations of the plurality of storage devices. The host device extracts the model information of a failed storage device from among the plurality of storage devices and transmits the extracted model information to another storage device from among the plurality of storage device, the another storage device being in a normal operational state.

BRIEF DESCRIPTION OF THE DRAWINGS

Embodiments of the inventive concepts will be more clearly understood from the following detailed description taken in conjunction with the accompanying drawings in which.

DETAILED DESCRIPTION OF THE EMBODIMENTS

Hereinafter, embodiments of the inventive concepts will be described in detail with reference to the accompanying drawings.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
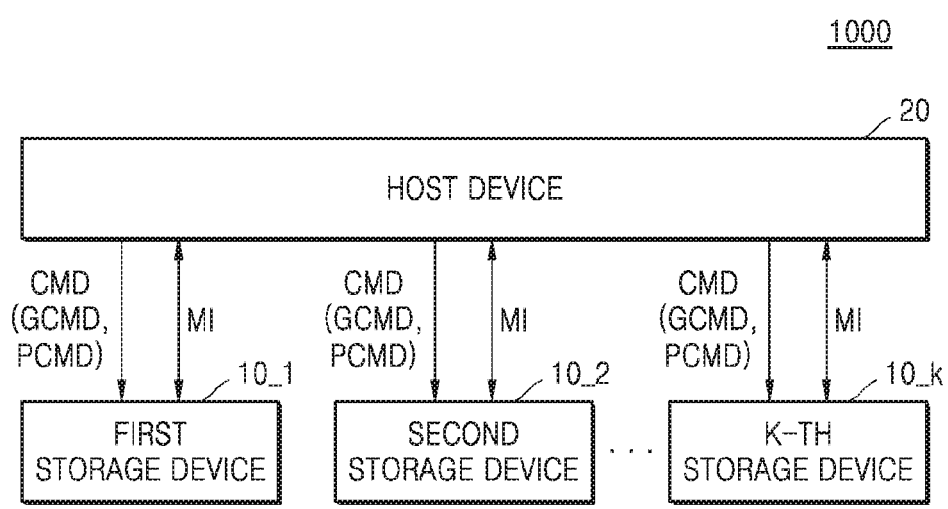
FIG. 1 illustrates a block diagram of a storage system according to embodiments of the inventive concepts.

FIG. 1 illustrates a block diagram of a storage system 1000 according to embodiments of the inventive concepts.

The storage system 1000 may be implemented as, for example, a personal computer (PC), a data server, a network-attached storage (NAS), an Internet of Things (IoT) device, or a portable electronic device. The portable electronic device may include for example a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, or a wearable device, among various other devices.

Referring to FIG. 1, the storage system 1000 may include first to k-th storage devices 10_1, 10_2 to 10_k (i.e., 10_1 to 10_k) and a host device 20. The host device 20 may manage the overall operation of the storage system 1000. For example, k may be a natural number of 3 or more, but the inventive concepts are not limited thereto, as the storage system 1000 may include two storage devices connected to one host device 20.

In an embodiment, the storage system 1000 may be a redundant array of inexpensive disks (RAID) storage system, and the first to k-th storage devices 10_1 to 10_k may constitute a RAID area. That is, the host device 20 may perform RAID recovery using data constituting a RAID stripe and RAID parity in the first to k-th storage devices 10_1 to 10_k. In an embodiment, the host device 20 may perform RAID recovery based on XOR operations using the data and the RAID parity.

Alternatively, in an embodiment, the first to k-th storage devices 10_1 to 10_k may be storage devices in which the same application is executed.

In FIG. 1, the storage system 1000 includes the first to k-th storage devices 10_1 to 10_k connected to one host device 20, but the inventive concepts are not limited thereto. The storage system 1000 may include a plurality of different host devices, or a plurality of storage devices connected to the respective host devices.

The first to k-th storage devices 10_1 to 10_k may be any type of storage device capable of storing data. In an embodiment, the first to k-th storage devices 10_1 to 10_k may be solid state drive (SSD) devices, however, the inventive concepts are not limited thereto.

The first to k-th storage devices 10_1 to 10_k may respectively obtain information about conditions necessary to perform the internal operations of the first to k-th storage devices 10_1 to 10_k using a machine learning model. For example, the first to k-th storage devices 10_1 to 10_k may respectively schedule the internal operations of the first to k-th storage devices 10_1 to 10_k using the machine learning model, or may respectively obtain threshold values necessary for performing the internal operations of the first to k-th storage devices 10_1 to 10_k.

In an embodiment, the host device 20 may be implemented as an application processor (AP) or a system-on-a-chip (SoC). The host device 20 may communicate with the first to k-th storage devices 10_1 to 10_k through a host interface (such as host interface 130 shown in FIG. 2 for example).

The host device 20 may transfer a command CMD to each of the first to k-th storage devices 10_1 to 10_k to control the operation of each of the first to k-th storage devices 10_1 to 10_k. For example, the host device 20 may transmit a write command to each of the first to k-th storage devices 10_1 to 10_k to write data to each of the first to k-th storage devices 10_1 to 10_k, or may transmit a read command to each of the k-th storage devices 10_1 to 10_k to read the data from each of the first to k-th storage devices 10_1 to 10_k.

In an embodiment, the host device 20 may transfer a get command GCMD to each of the first to k-th storage devices 10_1 to 10_k to extract model information MI of the machine learning model from each of the first to k-th storage devices 10_1 to 10_k. In an embodiment, the host device 20 may transfer a put command PCMD to each of the first to k-th storage devices 10_1 to 10_k to arrange the model information MI of the machine learning model in each of the first in k-th storage devices 10_1 to 10_k. For example, the machine learning model may include an artificial neural network.

In an embodiment, the model information MI may include model data and model metadata. For example, the model data may include model architecture and model parameters, and the model metadata may include data about the accuracy of a model, the training time of the model, and the amount of training data of the model.

The host device 20 of the storage system 1000 may extract the model information MI of the machine learning model stored in a storage device from among the first to k-th storage devices 10_1 to 10_k that is determined to be in a fail state. The host device 20 may transmit the extracted model information MI to a storage device from among the first to k-th storage devices 10_1 to 10_k that is in a normal state (i.e., a normal operational state). The extracted model information MI may be arranged in the storage device in the normal state. Therefore, when the use of a specific storage device among the first to k-th storage devices 10_1 to 10_k is impossible, the storage system 1000 may arrange the model information MI in a new storage device, thereby continuously using the model information MI of the machine learning model between (or in) different storage devices.

Also, the host device 20 may transfer a model training command to each of the first to k-th storage devices 10_1 to 10_k, and each of the first to k-th storage devices 10_1 to 10_k may perform a machine learning model training operation in response to the model training command. The host device 20 may transfer a model inference command to each of the first to k-th storage devices 10_1 to 10_k, and each of the first to k-th storage devices 10_1 to 10_k may perform a machine learning model inference operation in response to the model inference command.

Figure 2A:
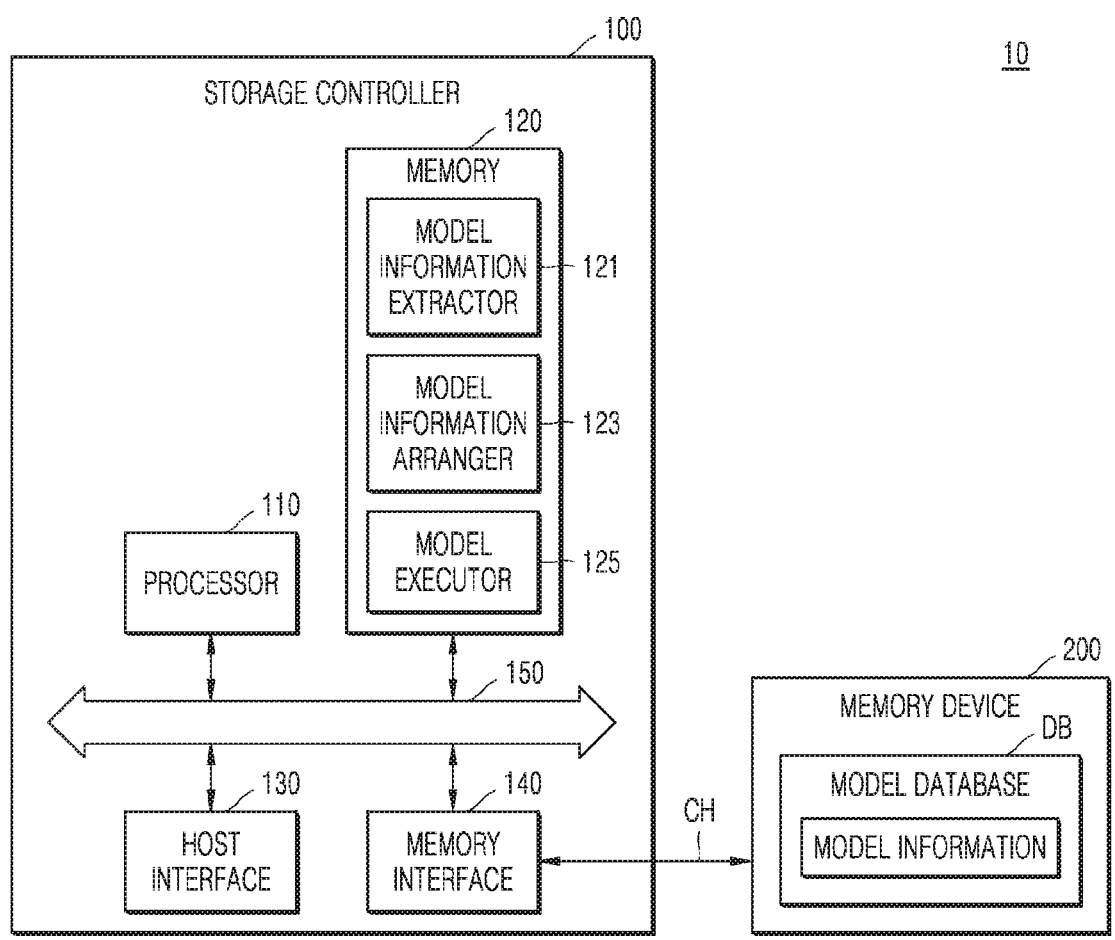
FIG. 2A illustrates a block diagram showing a storage device according to embodiments of the inventive concepts.
Figure 2B:
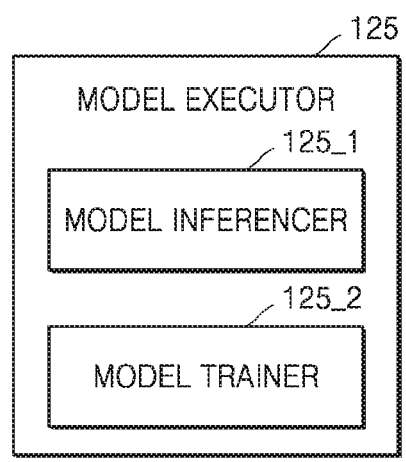
FIG. 2B illustrates a diagram of a model executor loaded onto the storage device of FIG. 2A according to embodiments of the inventive concepts.

FIG. 2A illustrates a block diagram showing a storage device 10 according to embodiments of the inventive concepts. FIG. 2B illustrates a diagram of a model executor 125 loaded onto the storage device 10 of FIG. 2A according to embodiments of the inventive concepts. The storage device 10 of FIG. 2A may be one of first to nth storage devices 10_1 to 10_n of FIG. 1.

The storage device 10 may include a flash memory device including one or more flash memory chips. For example, the storage device 10 may include a plurality of NAND memory chips that non-volatilely store data.

In an embodiment, the storage device 10 may be an embedded memory embedded in the storage system (e.g., 1000 in FIG. 1). For example, the storage device 10 may be an embedded Multi-Media Card (eMMC®) or an embedded Universal Flash Storage (UFS) memory device. In an embodiment, the storage device 10 may be an external memory detachable from the storage system 1000. For example, the storage device 10 may be a UFS memory card, a CompactFlash® (CF) card, a Security Digital™ (SD) card, a Micro Secure Digital (Micro-SD) card, a Mini Secure Digital (Mini-SD) card, extreme Digital (xD), or a Memory Stick™ (MS).

Referring to FIG. 2A, the storage device 10 may include a storage controller 100 and a memory device 200. The storage device 10 may further include other components, such as for example a buffer memory and a power management circuit. The storage device 10 may access the memory device 200 or perform requested operations in response to the command CMD provided from the host device (e.g., 20 in FIG. 1).

The storage controller 100 may control the operation of the memory device 200 through a channel CH. For example, the storage controller 100 may write data to the memory device 200 or read data from the memory device 200.

The storage controller 100 may include a processor 110, a memory 120, a host interface 130, and a memory interface 140. The processor 110, the memory 120, the host interface 130, and the memory interface 140 may communicate with each other via a bus 150. The storage controller 100 may further include other components.

The processor 110 may control the overall operation of the storage controller 100. The processor 110 may include a central processing unit or a microprocessor. In an embodiment, the processor 110 may be implemented as a multi-core processor, for example, a dual-core processor or a quad-core processor.

The processor 110 may execute firmware for driving the storage controller 100. The firmware may be loaded into the memory 120 and executed. For example, the processor 110 may perform garbage collection for managing the memory device 200 or a flash translation layer for performing address mapping, wear leveling, etc. by executing firmware for driving the storage controller 100.

The memory 120 may operate under the control of the processor 110. The memory 120 may be used as an operating memory, cache memory, or buffer memory of the processor 110. Software, firmware, and data for controlling the storage controller 100 may be loaded in the memory 120. The memory 120 may be implemented as a volatile memory such as dynamic random access memory (DRAM) or static random access memory (SRAM). Alternatively, the memory 120 may be implemented as a resistive memory such as RRAM, PRAM or MRAM. For example, a model information extractor 121, a model information arranger 123, and the model executor 125 may be loaded in the memory 120.

The processor 110 may read model information that is requested to be extracted from the host device 20 from a database DB of the memory device 200, and may transmit the read model information to the host device 20 by executing the model information extractor 121. The processor 110 may write model information that is requested to be arranged from the host device 20 in the database DB of the memory device 200 by executing the model information arranger 123.

Referring to FIGS. 2A and 2B, the model executor 125 may include a model inferencer 125_1 and a model trainer 125_2. The processor 110 may schedule tasks according to an access request from the host device 20 and background tasks or foreground tasks for managing the storage device 10 by executing the model inferencer 125_1 using the model information. For example, the processor 110 may schedule a garbage collection operation by executing the model inferencer 125_1 using the model information. In addition, the processor 110 may obtain various threshold values and parameters used for the operation of the storage device 10 by executing the model inferencer 125_1 using the model information.

Further, the processor 110 may train a machine learning model stored in the storage device 10 by executing the model trainer 125_2 loaded in the memory 120, and the training degree of the machine learning model may increase. As the training degree of the machine learning model increases, the accuracy of the machine learning model may increase.

Referring to FIG. 2A, the host interface 130 may perform communication with the host device 20. For example, the host interface 130 may provide a physical connection between the host device 20 and the storage device 10. The host interface 130 may adjust the size of data exchanged with the storage device 10, or convert the format of commands exchanged with the storage device 10, in response to a transmission format of the host device 20, that is, a bus format.

For example, the host interface 130 may format model information to be transmitted to the host device 20 to correspond to the transmission format of the host device 20. In addition, the host interface 130 may format the model information (e.g., MI of FIG. 1) received from the host device 20 to correspond to the internal format of the storage device 10.

The bus format of the host device 20 may be configured as for example at least one of Universal Serial Bus (USB), Small Computer System Interface (SCSI), Peripheral Component Interconnection (PCI) express, AT Attachment (ATA), Parallel AT Attachment (PATA), Serial AT Attachment (SATA), and Serial Attached SCSI (SAS). A non-volatile memory express (NVMe) protocol mounted on the host device 20 exchanging data by using PCI express may be applied to the host interface 130.

The memory interface 140 may exchange data with the memory device 200. The memory interface 140 may write data to the memory device 200 via the channel CH, and read the data from the memory device 200 via the channel CH. For example, the memory interface 140 may transmit model information to the memory device 200 through the channel CH, and may receive the model information from the memory device 200 through the channel CH. In an embodiment, the model information stored in the memory device 200 may be formatted such that the model information MI received from the host device 20 corresponds to a storage format inside the storage device 10.

The memory device 200 may include a flash memory, and the flash memory may include a 2D NAND memory array or a 3D (or vertical) NAND (VNAND) memory array. The 3D memory array is a circuit associated with arrays of memory cells having an active region disposed on a silicon substrate, or operations of the memory cells and is formed monolithically on the substrate or at least one physical level of a circuit formed in the substrate. The term "monolithic" means that layers of each level constituting the array are stacked directly above the layers of each lower level of the array.

In an embodiment, the 3D memory array includes vertical NAND strings arranged in a vertical direction such that at least one memory cell is located above the other memory cell. The at least one memory cell may include a charge trap layer.

U.S. Pat. Nos. 7,679,133, 8,553,466, 8,654,587, and 8,559,235, and U.S. Patent Application Publication No. 2011/0233648 describe appropriate configurations of a 3D memory array including a plurality of levels and sharing word lines and/or bit lines between the levels, and may be combined herein in the cited documents.

In embodiments, the memory device 200 may include other various types of non-volatile memories. For example, the memory device 200 may include non-volatile memory, and the non-volatile memory may employ various kinds of memories such as for example magnetic RAM (MRAM), spin-transfer torque MRAM, conductive bridging RAM (CBRAM), ferroelectric RAM (FeRAM), phase RAM (PRAM), resistive RAM, nanotube RAM, polymer RAM (PoRAM), nano floating gate memory (NFGM), holographic memory, molecular electronics memory, and insulator resistance change memory, among others.

Figure 3:
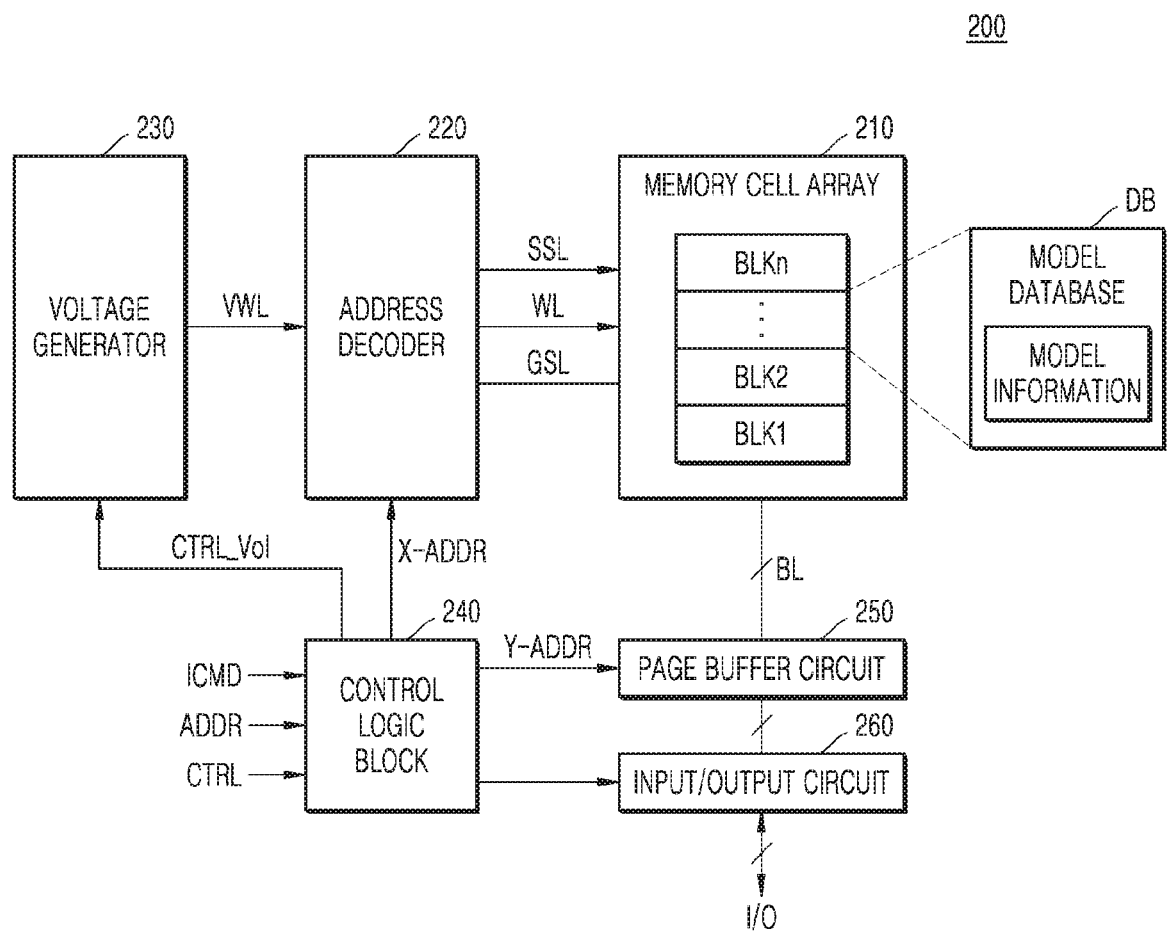
FIG. 3 illustrates a block diagram of a memory device of a storage device according to embodiments of the inventive concepts.

FIG. 3 illustrates a block diagram of the memory device 200 of a storage device according to embodiments of the inventive concepts.

Referring to FIG. 3, the memory device 200 may include a memory cell array 210, an address decoder 220, a voltage generator 230, a control logic block (e.g., a control circuit or a controller) 240, a page buffer circuit 250, and an input/output circuit 260. Although not illustrated, the memory device 200 may further include an input/output interface.

The memory cell array 210 may be connected to word lines WL, string selection lines SSL, ground selection lines GSL, and bit lines BL. The memory cell array 210 may be connected to the address decoder 220 through the word lines WL, the string selection lines SSL and the ground selection lines GSL, and may be connected to the page buffer circuit 250 through the bit lines BL.

The memory cell array 210 may include a plurality of memory blocks BLK1, BLK2 to BLKn (i.e., BLK1 to BLKn). The memory device 200 may perform an erase operation in units of memory blocks.

Each of the memory block BLK1 to BLKn may include a plurality of memory cells and a plurality of selection transistors. The memory cells may be connected to the word lines WL, and the selection transistors may be connected to the string selection lines SSL or the ground selection lines GSL. The memory cells of each of the memory block BLK1 to BLKn may include single-level cells storing 1-bit data or multi-level cells storing M-bit data (M is 2 or an integer greater than 2).

The memory cell array 210 may include a model database DB, and model information may be stored in the model database DB. The model information may include, for example, model data and model metadata. The model data may include model architecture and model parameters, and the model metadata may include data about the accuracy of a model, the training time of the model, and the amount of training data of the model.

The address decoder 220 may select one of the plurality of memory blocks BLK1 to BLKn of the memory cell array 210, may select one of the word lines WL of the selected memory block, and may select one of the plurality of string selection lines SSL.

The voltage generator 230 may generate various types of voltages for performing program, read, and erase operations on the memory cell array 210 based on a voltage control signal CTRL_Vol. For example, the voltage generator 230 may generate a word line voltage VWL such as for example a program voltage, a read voltage, a pass voltage, an erase verification voltage, or a program verification voltage. Also, the voltage generator 230 may generate a string selection line voltage and a ground selection line voltage based on the voltage control signal CTRL_Vol, and may generate an erase voltage to be provided to the memory cell array 210.

The control logic block 240 may output various control signals for performing the program, read, and erase operations on the memory cell array 210 based on an internal command ICMD, an address ADDR, and a control signal CTRL. The control logic block 240 may provide a row address X-ADDR to the address decoder 220, provide a column address Y-ADDR to the page buffer circuit 250, and provide the voltage control signal CTRL_Vol to the voltage generator 230.

The page buffer circuit 250 may operate as a write driver or a sense amplifier depending on an operation mode. During the read operation, the page buffer circuit 250 may sense the bit line BL of the selected memory cell under the control of the control logic block 240. The sensed data may be stored in latches provided inside the page buffer circuit 250. The page buffer circuit 250 may dump the data stored in the latches to the input/output circuit 260 under the control of the control logic block 240.

The input/output circuit 260 may temporarily store the internal command ICMD, the addresses ADDR, the control signal CTRL, and data DATA that are provided through an input/output line I/O from the outside of the memory device 200. The input/output circuit 260 may temporarily store read data of the memory device 200 and output the read data to the outside through the input/output line I/O at a designated time.

Figure 4:
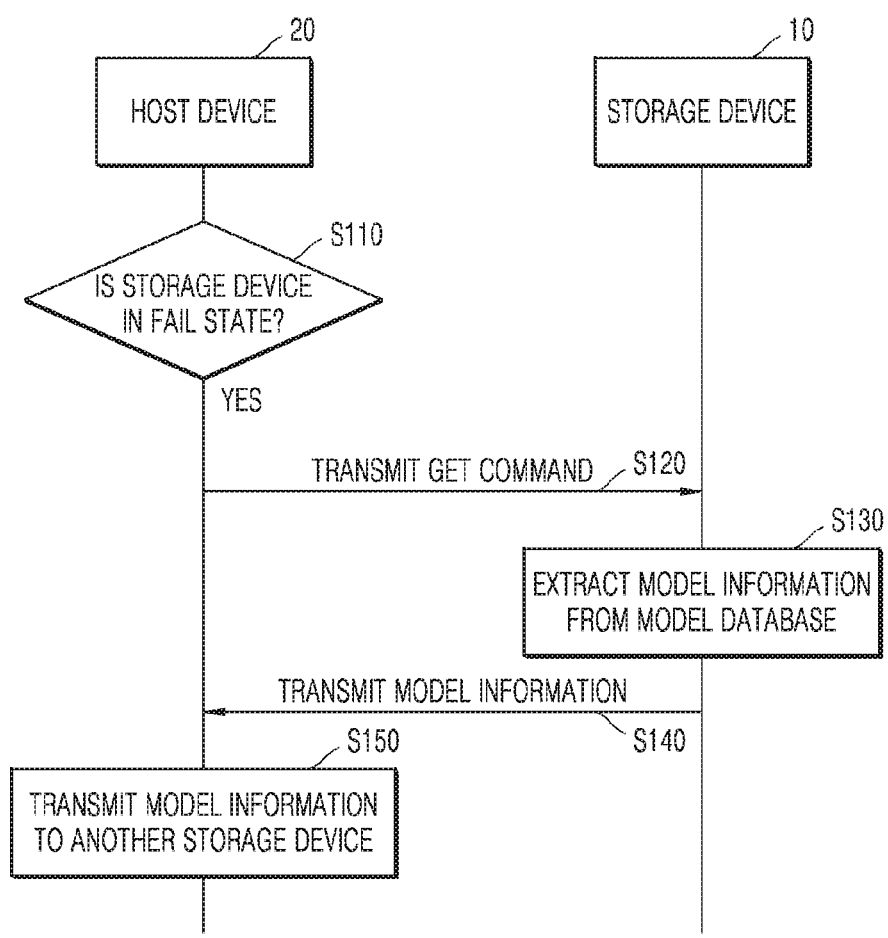
FIG. 4 illustrates a flowchart of an operating method of a storage system according to embodiments of the inventive concepts.
Figure 5A:
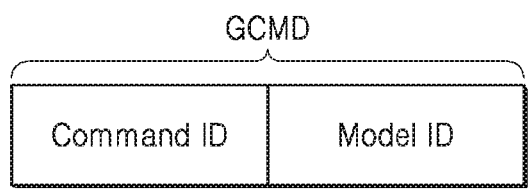
FIGS. 5A and 5B illustrate diagrams of a format of a get command and a format of a response according to the get command according to embodiments of the inventive concepts.
Figure 5B:
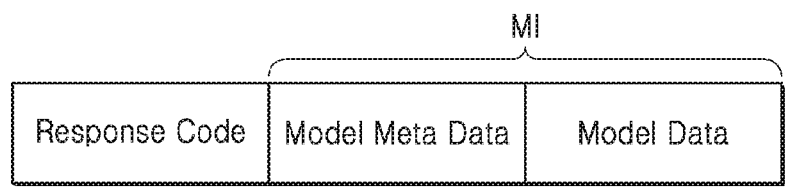

FIG. 4 illustrates a flowchart of an operating method of a storage system according to embodiments of the inventive concepts. FIGS. 5A and 5B respectively illustrate diagrams of a format of the get command GCMD and a format of a response according to the get command GCMD according to embodiments of the inventive concepts. FIG. 4 illustrates a diagram of an operation of extracting model information stored in the storage device 10. For example, operations S130 and S140 may be performed by a processor of the storage device 10 by executing the model information extractor 121 loaded in memory 120.

Referring to FIG. 4, the host device 20 determines whether the storage device 10 is in a fail state in operation S110. For example, the host device 20 may determine that the storage device 10 is in the fail state when an input for replacing the storage device 10 is received from a user. Alternatively, the host device 20 may determine that the storage device 10 is in the fail state in a case where the storage device 100 does not perform the read operation and the write operation, or in a case where the storage device 100 performs only the read operation, but the number of bad blocks of the storage device 10 exceeds a threshold value. Alternatively, the host device 20 may determine that the storage device 10 is in the fail state responsive to receiving a signal from the storage device 10 indicating that the storage device 10 is in the fail state.

When the storage device 10 is determined to be in the fail state, the host device 20 transmits the get command GCMD to the storage device 10 in operation S120. However, the storage system according to the inventive concepts is not limited to this, and even if the storage device 10 is determined to be in the normal state instead of the fail state, the host device 20 may transmit the get command GCMD to the storage device 10 so as to extract the model information from the storage device 10.

Referring to FIGS. 4, 5A and 5B, in operation S120 the host device 20 transmits the get command GCMD to the storage device 10. In an embodiment, the get command GCMD may include a command identifier (ID) and a model identifier (ID). For example, the command identifier may indicate whether a command is the get command GCMD or the put command PCMD, and the model identifier may indicate a model for extraction among models stored in the storage device 10.

In operation S130, the storage device 10 extracts the model information from a model database. The model information at this time may correspond to a format inside the storage device 10.

In operation S140, the storage device 10 transmits the model information MI corresponding to the get command GCMD to the host device 20. The model information MI may include model data and model metadata. For example, the model data may include model architecture and model parameters, and the model metadata may include information about the accuracy of a model or the training degree of the model. The information about the training degree of the model may include the training time of the model or the amount of training data of the model.

At this time, the storage device 10 may transmit a response code together with the model information MI. The response code may indicate a result of performing an operation according to the get command GCMD provided from the host device 20. For example, the storage device 10 may transmit the response code according to a result of determining whether a machine learning model corresponding to the model information extracted from the storage device 10 satisfies the reliability condition according to the get command GCMD. When the model does not satisfy the reliability condition, the storage device 10 may transmit only the response code indicating that the model does not satisfy the reliability condition without transmitting the model information MI.

In an embodiment, in operation S140 the storage device 10 may transmit the model information MI through a data pin among a plurality of output pins connected to the host device 20. However, when it is impossible to use the data pin of the storage device 10, the storage device 10 may transmit the model information MI through a pin among the plurality of output pins other than the data pin. For example, the storage device 10 may transmit the model information MI through an output pin for transmitting information about the power of the storage device 10.

In operation S150, the host device 20 transmits the model information MI to a storage device other than the storage device 10 to arrange the model information MI. The other storage device may be in the normal state. For example, when the first storage device 10_1 among the first to k-th storage devices 10_1 to 10_k of FIG. 1 is determined to be in the fail state, the host device 20 may extract the model informant MI stored in the first storage device 10_1 to transmit the model information MI to the second storage device 10_2.

In an embodiment, the storage device 10 and the other storage device may be storage devices connected to the same host device 20 and controlled by the same host device 20. For example, the storage device 10 and the other storage device may together form a RAID area. Alternatively, in an embodiment, the storage device 10 and the other storage device may be storage devices on which the same application is executed. Accordingly, when the use of a specific storage device among a plurality of storage devices is impossible, the storage system according to the inventive concepts may arrange the model information MI of a storage device in a fail state to another storage device capable of executing the same machine learning model, thereby continuously using the model information MI of the machine learning model between (or by) different storage devices.

Figure 6:
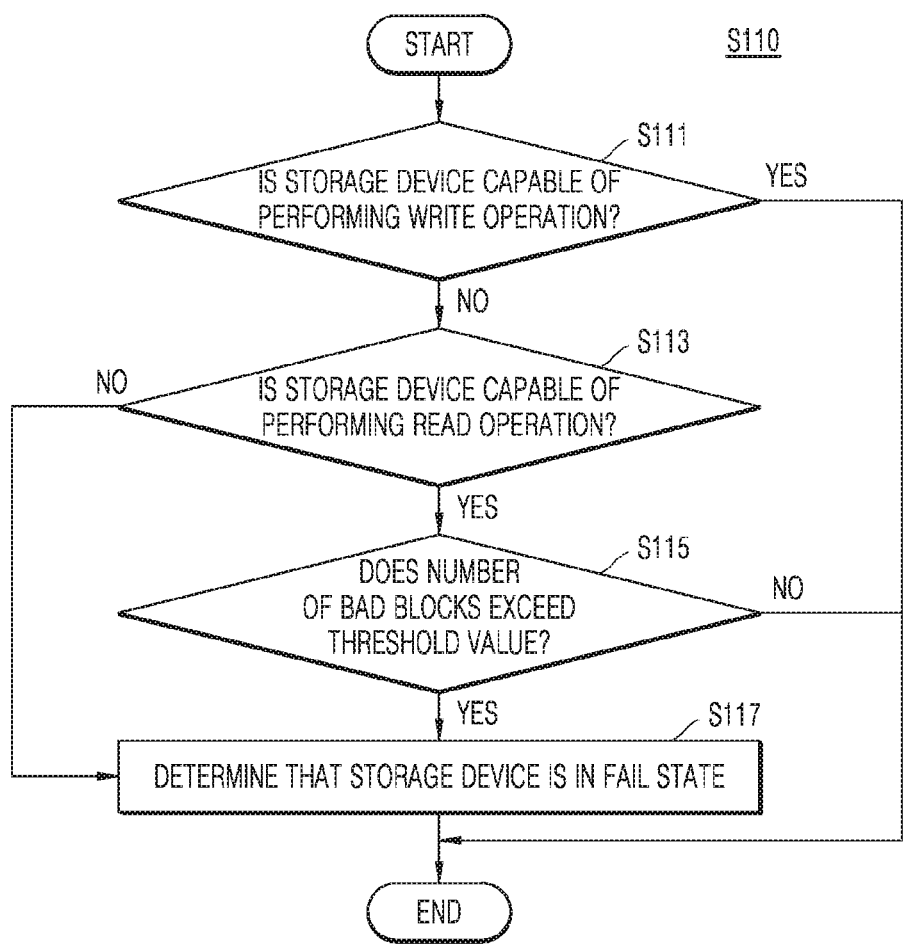
FIG. 6 illustrates a flowchart of an operating method of a storage system according to embodiments of the inventive concepts.

FIG. 6 illustrates a flowchart of an operating method of a storage system according to embodiments of the inventive concepts, and illustrates details of operation S110 of FIG. 4. Operation S110 may include operations S111 to S117.

Referring to FIG. 6, a host device (such as host device 20 in FIG. 1) determines whether a storage device (such as storage device 10 in FIG. 2A) is capable of performing a write operation in operation S111, and determines whether the storage device is capable of performing a read operation in operation S113. When the host device determines that the storage device is incapable of performing both the write operation (No in operation S111) and the read operation (No in operation S113), the host device determines that the storage device is in a fail state in operation S117. For example, the storage device may transmit to the host device a signal indicating that the storage device is incapable of performing both the write operation and the read operation to the host device, and when the host device receives the signal, the host device may determine that the storage device is incapable of performing both the write operation and the read operation and that the storage device is in the fail state.

When the storage device is capable of performing only the read operation (Read only) (Yes in operation S113), the host device determines whether the number of bad blocks of the storage device exceeds a threshold value in operation S115. When the storage device is capable of performing only the read operation, the storage device may transmit a signal indicating that the storage device is capable of performing only the read operation, and when the host device receives the signal, the host device may determine that the storage device is capable of performing only the read operation and perform operation S115.

In an embodiment, the threshold value that is a reference for the number of bad blocks may be a preset value. Alternatively, the threshold value may be a value that adaptively varies as the use period of the storage device changes. For example, a machine learning model that infers the threshold value that is the reference for determining the fail state of the storage device may be stored in the storage device, and a processor of the storage device may obtain the threshold value by executing a model executor.

When a bad block occurs in a memory device, the storage device may perform a recovery operation of replacing the bad block with a spare block. However, when the number of bad blocks among a plurality of memory blocks increases and exceeds the threshold value, the storage device may encounter difficulties performing the recovery operation to recover data of the bad blocks. Accordingly, when the number of bad blocks of the storage device exceeds the threshold value, the host device determines that the storage device is in the fail state in operation S117. For example, the storage device may provide the host device with information about the current number of bad blocks, and based on the information, the host device may determine whether the number of bad blocks increases and exceeds the threshold value.

However, the storage device according to the inventive concepts is not limited to the operating method of FIG. 6, as the storage device may provide information on whether the storage device is in the normal state or the fail state to the host device. In this embodiment, as the storage device determines whether the storage device is in the fail state on its own, the storage device may provide a signal indicating the fail state to the host device, and the host device may determine that the storage device is in the fail state by receiving the signal.

When the host device determines that the storage device is in the fail state in operation S117, the host device may perform operation S120 of FIG. 4.

Figure 7:
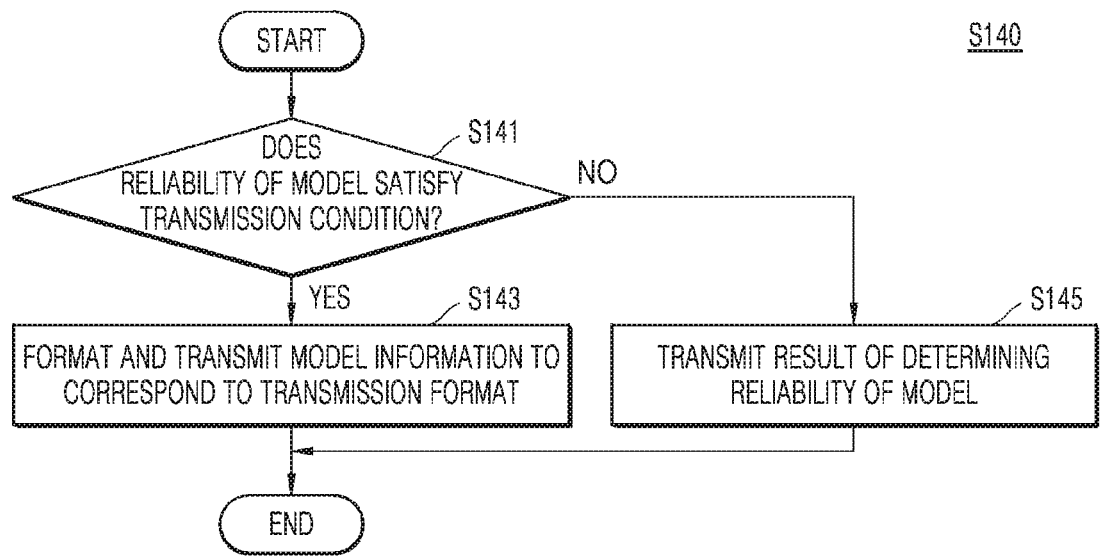
FIG. 7 illustrates a flowchart of an operating method of a storage system according to embodiments of the inventive concepts.

FIG. 7 illustrates a flowchart of an operating method of a storage system according to embodiments of the inventive concepts, and illustrates details of operation S140 of FIG. 4. Operation S140 may include operations S141 to S145. For example, operation S140 may be performed by a processor such as processor 110 of the storage device 10 by executing a model information extractor such as model information extractor 121 loaded in the memory 120.

Referring to FIG. 7, in operation S141, the storage device 10 determines whether the reliability of a machine learning model according to extracted model information satisfies a transmission condition. The reliability of the model may be determined by considering at least one of the accuracy of the model, the training degree of the model, and the size of the model. In an embodiment, the storage device 10 may determine whether the reliability of the model satisfies the transmission condition by determining whether the accuracy of the model is greater than or equal to a threshold value. In an embodiment, the threshold value that is a reference for the accuracy of the model may be a preset value. In addition, the storage device 10 may determine whether the model satisfies the reliability by determining whether the training amount of the model is greater than or equal to the threshold value, and also determine whether the model satisfies the reliability by determining whether the size of the model inversely proportional to the speed of executing the model is less than or equal to the threshold value.

When the reliability of the model satisfies the condition (Yes in operation S141), the storage device 10 formats the extracted model information to correspond to a transmission format and transmits the formatted extracted model information to the host device in operation S143. However, when the transmission format and the internal format of the storage device 10 are the same, the storage device 10 does not perform a separate formatting operation.

On the other hand, when the reliability of the model does not satisfy the condition (No in operation S142), the storage device 10 transmits a result of determining the reliability of the model in operation S145. For example, in operation S145, the storage device 10 transmits a response code including information that the reliability of the model does not satisfy the transmission condition.

Figure 8:
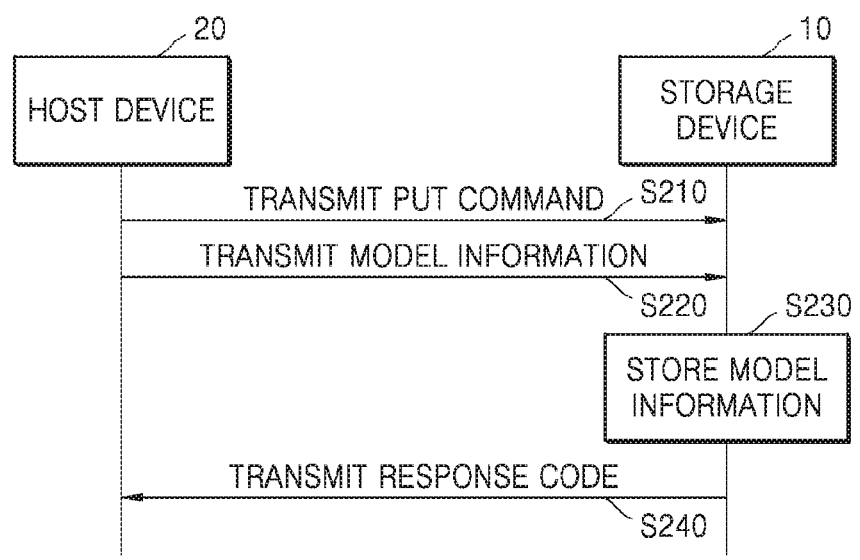
FIG. 8 illustrates a flowchart of an operating method of a storage system according to embodiments of the inventive concepts.
Figure 9:
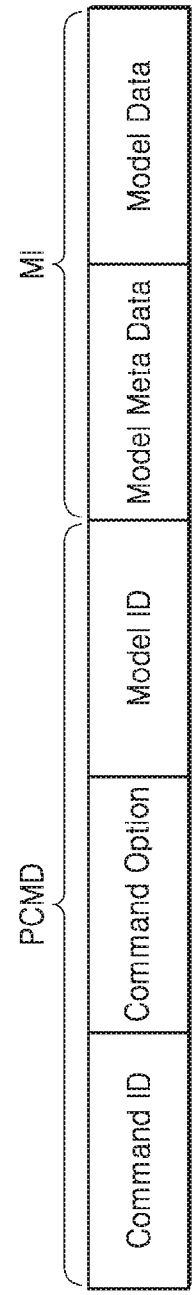
FIG. 9 illustrates a diagram of a format of a put command according to embodiments of the inventive concepts.

FIG. 8 illustrates a flowchart of an operating method of a storage system according to embodiments of the inventive concepts. FIG. 9 illustrates a diagram of a format of the put command PCMD according to embodiments of the inventive concepts. FIG. 8 illustrates a diagram of an operation of disposing model information to the storage device 10. For example, operation S230 may be performed by a processor such as processor 110 of the storage device 10 by executing a model information arranger such as model information arranger 123 loaded in the memory 120.

Referring to FIGS. 8 and 9, in operation S210, the host device 20 transmits the put command PCMD to the storage device 10. In an embodiment, the put command PCMD may include a command identifier (ID), a command option, and a model identifier (ID). For example, the command identifier may indicate whether the command is a get command or the put command PCMD, and the model identifier may indicate a machine learning model corresponding to model information to be arranged on the storage device 10.

The command option may include information about a method of arranging model information transmitted following the put command PCMD. For example, the command option may mean an option of the put command PCMD as to whether to temporarily store the model information transmitted following the put command PCMD in the storage device 10, whether to arrange the transmitted model information in the storage device 10 according to a result of comparing the transmitted model information with model information arranged in the storage device 10 or whether to arrange the transmitted model information in the storage device 10 without comparing the transmitted model information with the model information arranged in the storage device 10. At this time, the arrangement of the model information may mean storing the model information for use when executing a corresponding machine learning model in the storage device 10.

In operation S220, the host device 20 transmits the model information to the storage device 10. At this time, the model information may be model information extracted from a storage device other than the storage device 10.

The model information may be the same as the configuration of model information shown in FIG. 5B. That is, the model information may include model data and model metadata. For example, the model data may include model architecture and model parameters, and the model metadata may include data about the accuracy of a model, the training time of the model, and the amount of training data of the model.

In operation S230, the storage device 10 stores the model information. The model information stored in the storage device 10 may be model information that is received from the host device 20 and formatted in an internal format of the storage device 10. In an embodiment, the storage device 10 may temporarily store the model information in the storage device 10 according to a command option of the put command PCMD, may arrange the model information in the storage device 10 according to a result of comparing the model information with the model information arranged in the storage device 10 or may arrange the model information in the storage device 10 without comparing the model information with the model information arranged in the storage device 10.

In operation S240, the storage device 10 transmits a response code. The response code may indicate a result of performing an operation according to the put command PCMD provided from the host device 20. For example, the response code may indicate a result of whether the model information MI transmitted following the put command PCMD is stored in the storage device 10.

Figure 10:
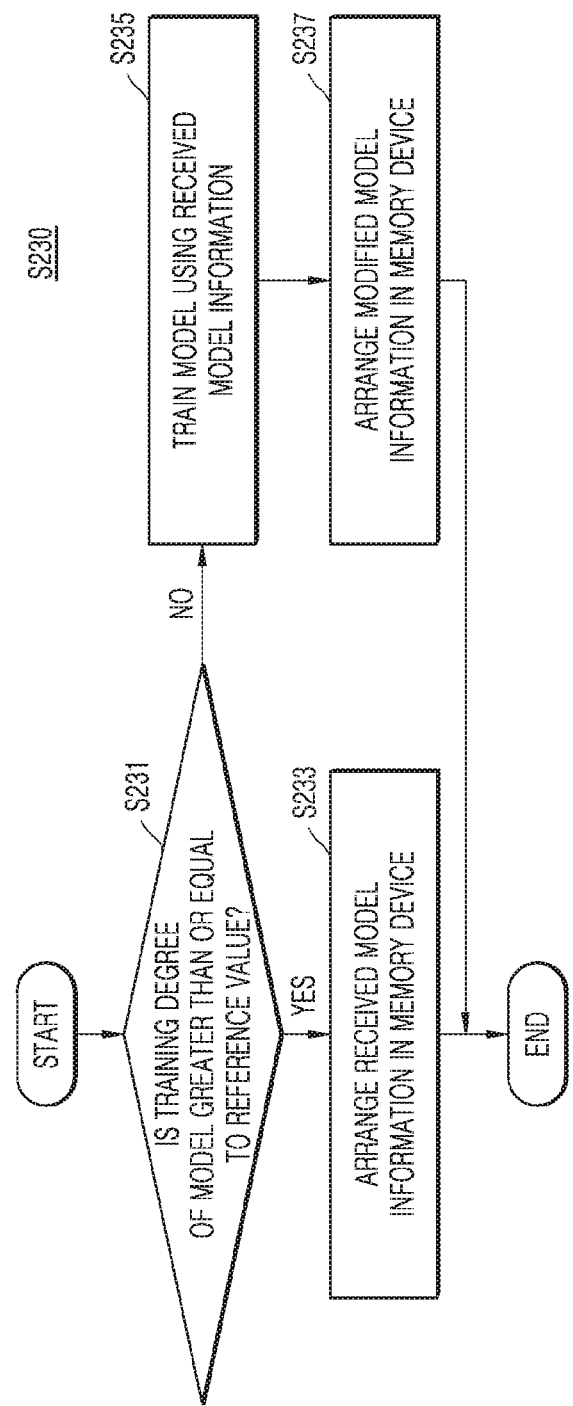
FIG. 10 illustrates a flowchart of an operating method of a storage system according to embodiments of the inventive concepts.

FIG. 10 illustrates a flowchart of an operating method of a storage system according to embodiments of the inventive concepts, and illustrates details of operation S230 of FIG. 8. Operation S230 may include operations S231 to S237. For example, operation S230 may be performed by a processor such as processor 110 of a storage device shown in FIG. 2A by executing a model information arranger such as model information arranger 123 loaded in memory 120.

Referring to FIG. 10, in operation S231, the storage device determines whether the training degree of a machine learning model is greater than or equal to a reference value based on model information received from a host device. For example, model metadata of the model information may include information about the training time of the model or the amount of training data of the model, and the storage device may determine whether the training degree of the machine learning model is greater than or equal to the reference value based on the model metadata. In an embodiment, the reference value that is a reference for the training degree of the model may be a preset value.

When the training degree of the model is greater than or equal to the reference value (Yes in operation S231), in operation S233 the storage device stores (i.e., arranges) the received model information in a memory device. At this time, the model information arranged in the memory device may be model information formatted in a format inside the storage device.

On the other hand, when the training degree of the model is less than the reference value (No in operation S231), in operation S235 the storage device performs a model training operation using the received model information. The storage device may increase the training degree of the machine learning model corresponding to the received model information by performing the model training operation. For example, the storage device may increase the training degree such that the training degree of the model is greater than or equal to the reference value. For example, operation S235 may be performed by a processor such as processor 110 of the storage device in FIG. 2A by executing a model trainer such as model trainer 125 loaded into the memory 120.

In operation S237, the storage device stores (i.e., arranges) the modified model information in the memory device. As the model training operation is performed in operation S235, the model information may be modified. For example, at least one of the model data and the model metadata included in the model information may be modified in operation S235, and the modified model information may be arranged in the memory device in operation S237.

The storage system according to the inventive concepts may determine a training degree of a model when arranging model information of another storage device in a specific storage device, and may perform an additional model training operation when the training degree of the model does not satisfy a reference value. Therefore, the storage system can ensure the performance of the machine learning model by performing an additional model training operation when placing the model information in the storage device.

Figure 11:
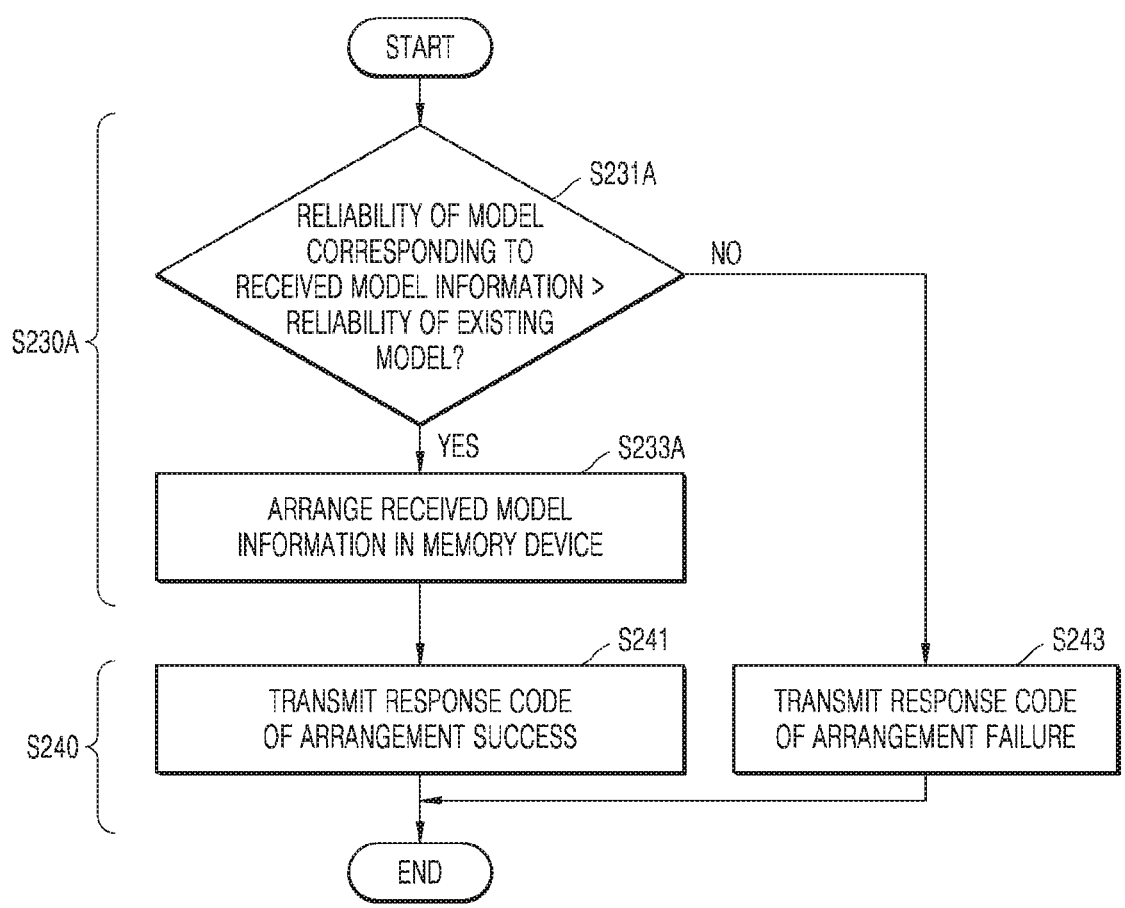
FIG. 11 illustrates a flowchart of an operating method of a storage system according to embodiments of the inventive concepts.

FIG. 11 illustrates a flowchart of an operating method of a storage system according to embodiments of the inventive concepts, and illustrates details of operations S230 and S240 of FIG. 8. Operation S230A includes operations S231A and S233A, and operation S240 includes operations S241 and S243. For example, operation S230A may be performed by a processor such as processor 110 of a storage device in FIG. 2A by executing a model information arranger such as model information arranger 123 loaded in the memory 120.

Referring to FIG. 11, in operation S231A, the storage device determines whether the reliability of a machine learning model corresponding to model information received from a host device is higher than the reliability of a machine learning model corresponding to model information stored in the storage device. For example, the reliability of the model may be determined by considering at least one of the accuracy of the model, the training degree of the model, and the size of the model.

When the reliability of the model corresponding to the received model information is higher than the reliability of the existing model (Yes in operation S231A), in operation S233A the storage device stores (i.e., arranges) the received model information in a memory device. At this time, the model information disposed in the memory device may be model information formatted in a format inside the storage device. In operation S241, the storage device transmits a response code indicating an arrangement success of the received model information.

Meanwhile, when the reliability of the model corresponding to the received model information is less than the reliability of the existing model, the storage device may maintain the existing model information without storing the received model information. In operation S243, the storage device may transmit a response code of an arrangement failure of the received model information.

The storage system according to the inventive concepts may compare the reliability of the existing model with the reliability of a new model when arranging new model information of another storage device in a specific storage device, and when the new model is determined to be more efficient, may arrange the new model information. Therefore, the storage system may prevent an operation of storing model information having low performance in the storage device, and the performance of the machine learning model of the storage device may be guaranteed.

Figure 12A:
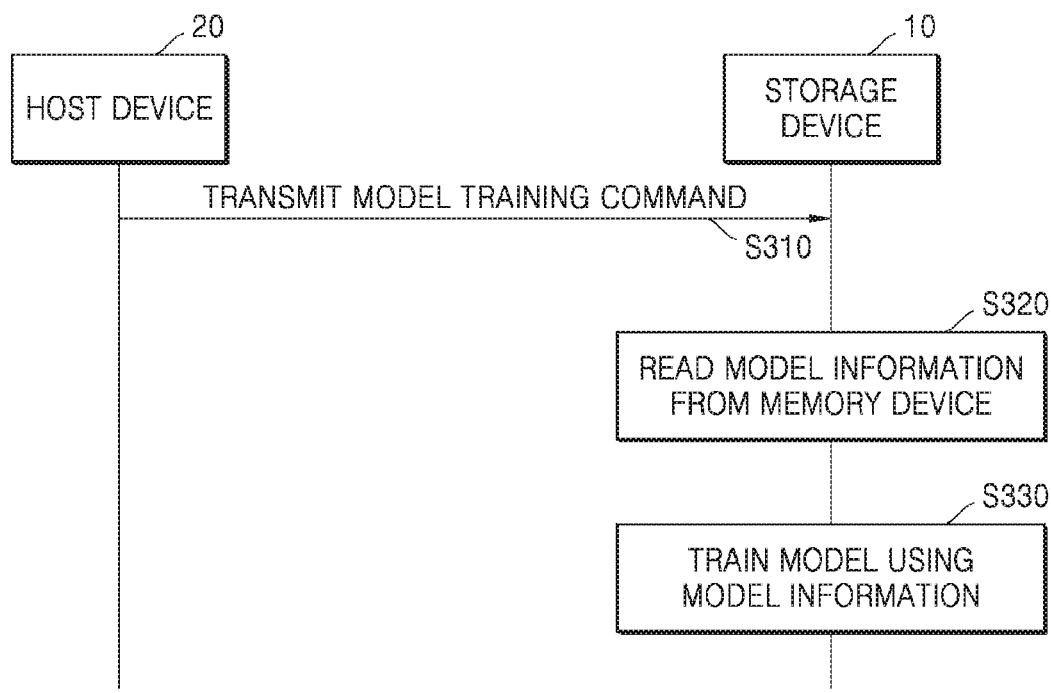
FIGS. 12A and 12B illustrate flowcharts of an operating method of a storage system according to embodiments of the inventive concepts.
Figure 12B:
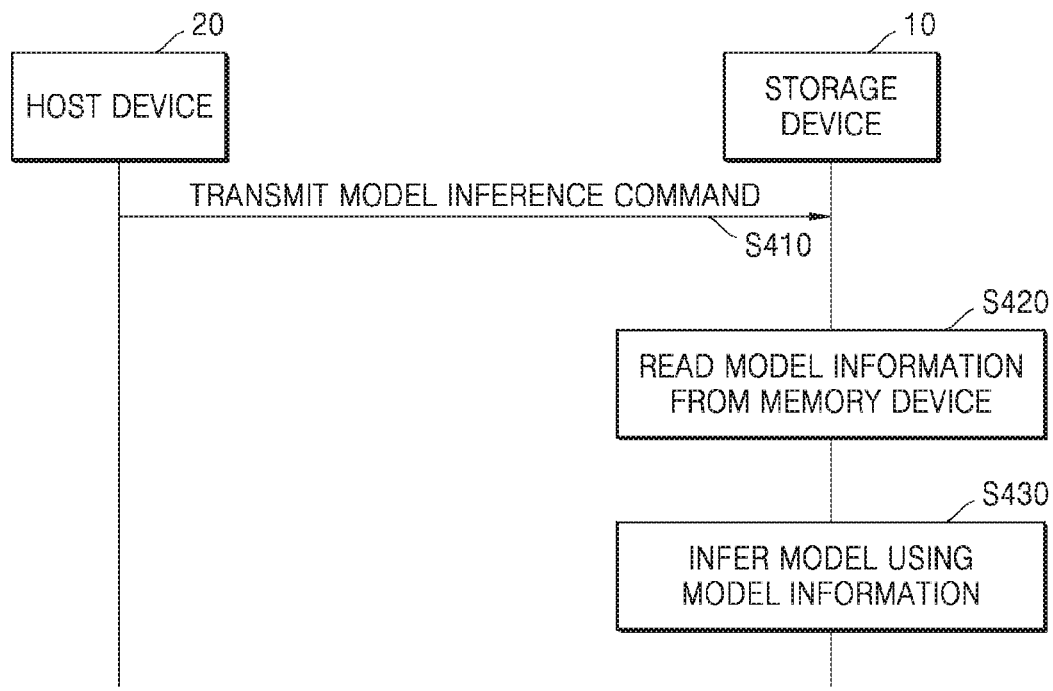

FIGS. 12A and 12B illustrate flowcharts of an operating method of a storage system according to embodiments of the inventive concepts. For example, operations S320 and S330 of FIG. 12A may be performed by a processor such as processor 110 of the storage device 10 by executing a model trainer such as model trainer 125_2 shown in FIG. 2B loaded in a memory 120, and operations S420 and S430 of FIG. 12B may be performed by the processor of the storage device 10 by executing a model inferencer such as model inferencer 125_1 loaded in the memory.

Referring to FIG. 12A, in operation S310 the host device 20 transmits a model training command to the storage device 10. In operation S320, the storage device 10 reads model information from a memory device in response to the model training command. In operation S330, the storage device 10 performs a model training operation using the read model information. As the model training operation is performed, the training degree of a machine learning model may increase and the accuracy of the machine learning model may increase. The storage system according to the inventive concepts may train the machine learning model inside the storage device 10 and may periodically perform the model training operation.

Referring to FIG. 12B, in operation S410, the host device 20 transmits a model inference command to the storage device 10. For example, the model inference command may be a command for activating a corresponding machine learning model.

In operation S420, the storage device 10 reads the model information from the memory device in response to the model inference command In operation S430, the storage device 10 performs a model inference operation using the read model information. The storage device 10 may schedule tasks according to an access request from the host device 20 through the model inference operation or may obtain various threshold values and parameters used for the operation of the storage device 10.

In addition to the model training command and the model inference command described in FIGS. 12A and 12B, the host device 20 may transmit various commands related to the machine learning model to the storage device 10. For example, the host device 20 may transmit a command for obtaining the number of machine learning models currently downloaded to the storage device 10 and information about the machine learning models to the storage device 10, and the storage device 10 may transmit the number of the currently downloaded machine learning models and the information of the machine learning models to the host device 20 in response to the command.

However, even if the storage device 10 according to the inventive concepts does not receive the model training command from the host device 20, the storage device 10 according to the inventive concepts may perform the model training operation by itself. For example, when it is determined that the training degree of the model is less than an internal reference training degree, the storage device 10 may perform the model training operation on the machine learning model stored therein, the training degree of the machine learning model may increase, and the accuracy of the machine learning model may increase.

Also, the storage device 10 may perform the model inference operation by itself, even if the storage device 10 does not receive the model inference command from the host device 20. For example, the host device 20 may perform the model inference operation using a learning model corresponding to an internal operation in order to perform the internal operation.

Figure 13:
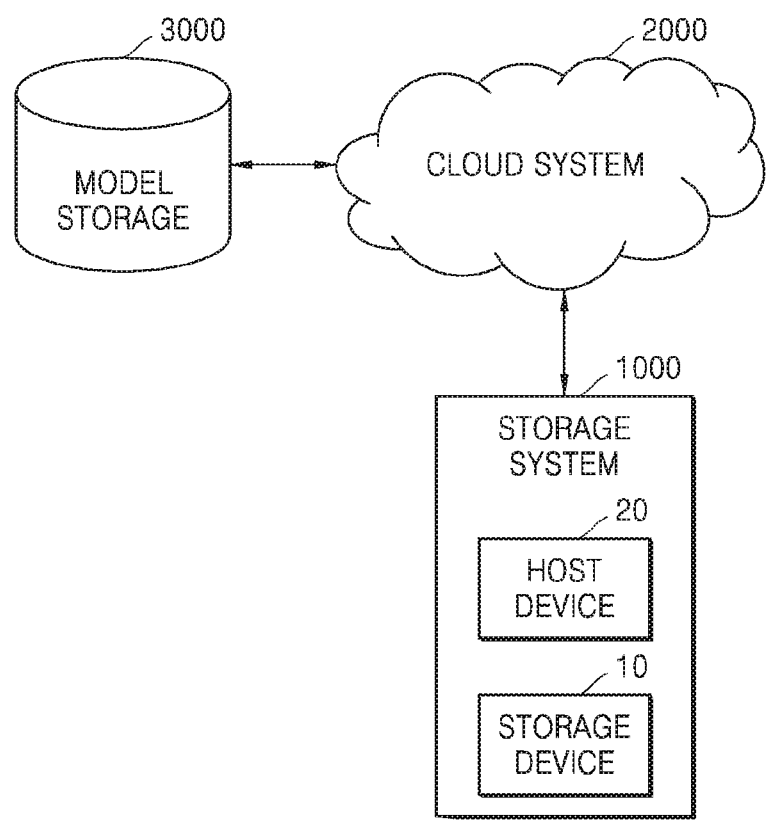
FIG. 13 illustrates a block diagram of a system to which a storage system according to embodiments of the inventive concepts may be applied.

FIG. 13 illustrates a block diagram of a system to which the storage system 1000 is applied according to embodiments of the inventive concepts.

Referring to FIG. 13, the storage system 1000 may include the host device 20 and the storage device 10, and the host device 20 may receive model information from the storage device 10. The host device 20 may transmit the model information to a cloud system 2000. The model information transmitted to the cloud system 2000 may be model information that is received from the storage device 10 and is formatted in a transmission format corresponding to the cloud system 2000.

A model storage 3000 of a cloud environment may manage the model information of the machine learning model and provide the model information according to a request of the storage system 1000. The storage system 1000 may download the model information from the model storage 3000.

In FIG. 13, only one storage system 1000 is shown as connected to the cloud system 2000, however a plurality of storage systems may be connected to the cloud system 2000. The model storage 3000 of the cloud environment may manage model information for each type of the plurality of storage systems. Accordingly, the model information of the storage system 1000 may be transferred to another storage system, or conversely, model information of another storage system may be downloaded from the storage system 1000. For example, when the life of the storage system 1000 is deemed to have expired, the model information of the storage system 1000 may be recycled in other storage systems through the cloud system 2000.

While the inventive concepts have been particularly shown and described with reference to embodiments thereof, it should be understood that various changes in form and details may be made therein without departing from the spirit and scope of the following claims.

What is claimed is:

1. A storage device comprising:
a memory device storing model information of a machine learning model; and
a storage controller configured to control an operation of the storage device using the machine learning model,
wherein the storage controller, upon receiving from a host device a get command for extracting the model information from the memory device, is further configured to transmit the model information extracted from the memory device to the host device, the host device external of the storage device,
wherein the model information is changed as a model training operation of the storage controller is performed, and comprises model data and model metadata,
wherein the model data comprises a model architecture of the machine learning model and model parameters of the machine learning model, and
wherein the model metadata comprises information about an accuracy of the machine learning model and a training degree of the machine learning model.

2. The storage device of claim 1, wherein the get command comprises a command identifier and an identifier of the machine learning model.

3. The storage device of claim 1, wherein the storage controller is further configured to determine whether a reliability of the machine learning model satisfies a transmission condition based on at least one of the accuracy and the training degree, and
in a case where the reliability of the machine learning model satisfies the transmission condition, format the model information to correspond to a transmission format and transmit the formatted model information to the host device.

4. The storage device of claim 1, wherein the storage controller, upon receiving from the host device a put command for arrangement of the model information and upon receiving new model information, is further configured to store the new model information in the memory device in response to the put command.

5. The storage device of claim 4, wherein the put command comprises a command identifier, a command option comprising information indicative of how to arrange the new model information, and an identifier of a machine learning model corresponding to the new model information.

6. The storage device of claim 4, wherein in a case where a training degree of a machine learning model corresponding to the new model information is less than a reference value, the storage controller is further configured to train the machine learning model corresponding to the new model information using the new model information, and store model information modified by the training of the machine learning model corresponding to the new model information in the memory device.

7. The storage device of claim 4, wherein the storage controller is further configured to store the new model information in the memory device according to a result of comparing a model reliability of a machine learning model corresponding to the new model information and a model reliability of the machine learning model corresponding to the model information stored in the memory device.

8. The storage device of claim 1, wherein upon receiving from the host device a model training command, the storage controller is further configured to train the machine learning model in response to the model training command.

9. A storage system comprising:
a first storage device and a second storage device each storing model information of a machine learning model; and
a host device configured to manage operations of the first storage device and the second storage device,
wherein the host device is further configured to transmit to the first storage device a get command for extracting the model information when the first storage device is in a fail state, and
wherein the first storage device is further configured to extract the model information stored in the first storage device in response to the get command and transmit the model information to the host device,
wherein the model information is changed as a model training operation inside the first storage device is performed.

10. The storage system of claim 9, wherein the host device is further configured to transmit to the first storage device the get command for extracting the model information when the first storage device is incapable of performing a data read operation and a data write operation.

11. The storage system of claim 9, wherein the host device is further configured to transmit to the first storage device the get command for extracting the model information when the first storage device is capable of performing only a data read operation and not a data write operation, and a number of bad blocks included in the first storage device exceeds a threshold value.

12. The storage system of claim 9, wherein the host device is further configured to transmit to the second storage device a put command for arrangement of the model information and the model information extracted from the first storage device.

13. The storage system of claim 12, wherein in a case where a training degree of a machine learning model corresponding to the model information is less than a reference value, the second storage device is further configured to train the machine learning model corresponding to the model information transmitted with the put command using the model information transmitted with the put command, and
store model information modified by the training of the machine learning model corresponding to the model information transmitted with the put command in the second storage device.

14. The storage system of claim 12, wherein in a case where a model reliability of the model information transmitted with the put command is higher than a model reliability of the model information stored in the second storage device, the second storage device is further configured to store the model information transmitted with the put command, and
in a case where the model reliability of the model information transmitted with the put command is lower than the model reliability of the model information stored in the second storage device, the second storage device is further configured to transmit to the host device a response code of an arrangement operation failure according to the put command.

15. An operating method of a storage system comprising a plurality of storage devices and a host device configured to manage operations of the plurality of storage devices, the operating method comprising:
determining, by the host device, that a first storage device from among the plurality of storage devices and that stores model information of a machine learning model is in a fail state;
transmitting, by the host device, a get command for extracting the model information to the first storage device;
transmitting, by the first storage device, the model information to the host device in response to the get command; and
rearranging, by the host device, the model information in a second storage device from among the plurality of storage devices other than the first storage device.

16. The operating method of claim 15, wherein the determining the first storage device is in the fail state comprises:
determining whether the first storage device is capable of performing a write operation;
determining whether the first storage device is capable of performing a read operation; and
determining that the first storage device is in the fail state when the first storage device is incapable of performing the write operation and the read operation.

17. The operating method of claim 15, wherein the transmitting the model information comprises:
determining whether a reliability of the machine learning model satisfies a transmission condition based on at least one of an accuracy of the machine learning model and a training degree of the machine learning model included in the model information; and
in a case where the reliability of the machine learning model satisfies the transmission condition, formatting the model information to correspond to a transmission format and transmitting the formatted model information to the host device.

18. The operating method of claim 15, wherein the rearranging the model information comprises:
the host device transmitting a put command for arrangement of the model information and the model information to the second storage device; and
the second storage device storing the model information in response to the put command.

19. The operating method of claim 18, wherein the storing of the model information comprises:
training the machine learning model using the model information; and
storing model information modified by the training of the machine learning model.

* * * * *